United States Patent

[11] 3,596,190

| [72] | Inventor | Richard Carlile Marshall<br>Harpenden, England |
|------|----------|-----------------------------------------------|
| [21] | Appl. No | 707,106 |
| [22] | Filed | Feb. 21, 1968 |
| [45] | Patented | July 27, 1971 |
| [73] | Assignee | George Kent Limited<br>London, England |
| [32] | Priority | Feb. 27, 1967 |
| [33] | | Great Britain |
| [31] | | 9280/67 |

[54] DETECTION OF THE RATE OF CHANGE OF AN ELECTRIC VOLTAGE
7 Claims, 1 Drawing Fig.

[52] U.S. Cl.................................................. 328/151,
307/152, 307/235, 324/77 R, 328/114, 328/132
[51] Int. Cl.................................................. H03k 5/00,
H03k 17/00
[50] Field of Search......................................... 328/114,
132, 151; 307/152, 235, 240; 324/77 A, 77 R;
73/23.1; 235/151.35, 151.13, 151.32

[56] References Cited
UNITED STATES PATENTS

| 2,445,773 | 7/1948 | Frost | 328/132 |
| 2,822,478 | 2/1958 | Donovan | 328/132 |
| 3,305,786 | 2/1967 | Smith | 328/132 |
| 3,361,979 | 1/1968 | Luttik | 328/114 |
| 3,434,062 | 3/1969 | Cox | 328/114 |
| 3,435,252 | 3/1969 | Eubanks | 328/132 |
| 3,226,648 | 12/1965 | Davidson | 328/97 X |
| 3,418,490 | 12/1968 | Hofferber | 307/240 X |
| 3,431,492 | 3/1969 | James et al. | 324/77 X |

Primary Examiner—Stanley D. Miller, Jr.
Attorney—Young & Thompson

ABSTRACT: A device for detecting the slope of a variable electric signal by periodically sampling the signal, which may be obtained for example from a gas chromatograph is operated so that the sampling frequency is varied in a predetermined way with time in accordance with the expected variation of the signal. The slope detecting device can thus be operated with optimum sensitivity and speed of response over an entire chromatograph spectrum. Control of the device can be effected by apparatus providing a control signal of a frequency varied in steps or continuously.

PATENTED JUL 27 1971
3,596,190
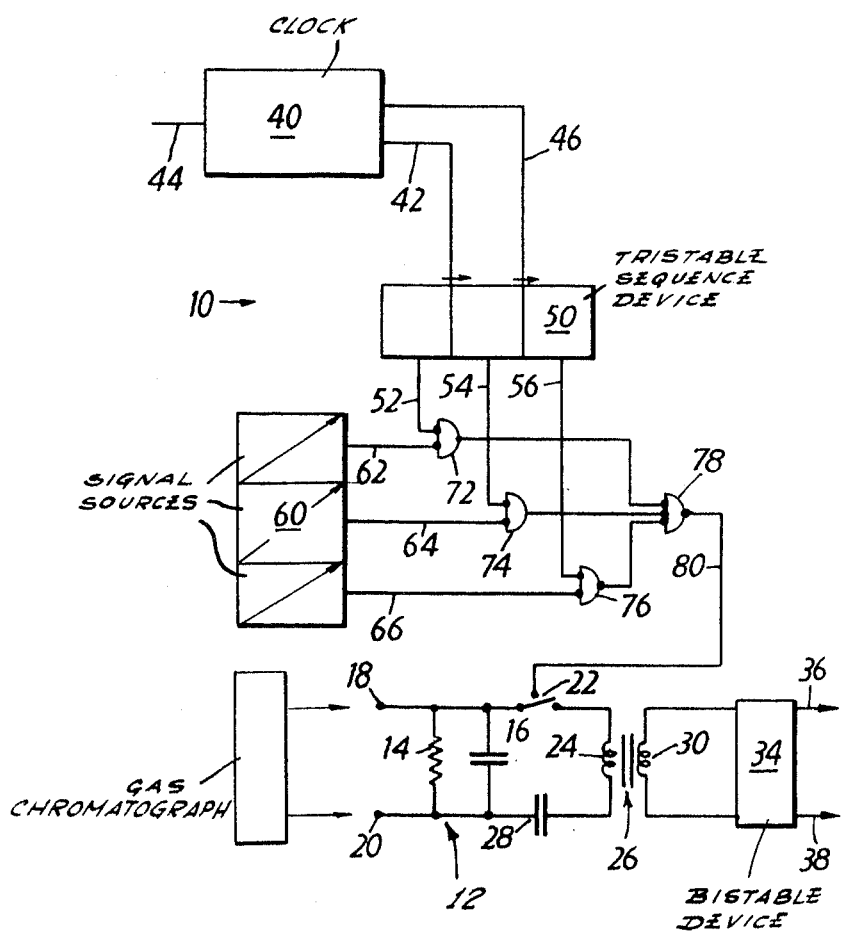
INVENTOR
RICHARD CARLILE MARSHALL
By Young & Thompson
ATTYS.

DETECTION OF THE RATE OF CHANGE OF AN ELECTRIC VOLTAGE

This invention relates to the control of devices for detecting the slope, or rate of change, of a variable electric signal. It has as its objects the provision of a method and means affording improved control of such devices.

The invention accordingly provides apparatus for controlling a device for detecting the slope of a variable electric signal, the apparatus comprising control means for varying with time the sensitivity and the bandwidth of the device in opposed directions in a predetermined way. Where the device is arranged to sample the signal periodically the control means can be operable to vary the sampling frequency of the device.

The invention also provides a method of controlling a device for detecting the slope of a variable electric signal in which the sensitivity and the bandwidth of the device are varied in opposed directions in a predetermined way from a time at which the signal has a selected value.

If the invention is applied to a slope detecting device which operates by periodically sampling the variable signal, the sampling frequency of the device is varied during a detecting operation through a range appropriate to the expected change of slope of the incoming signal.

With a relatively high sampling frequency, less of a given signal will enter the device in each sampling period, and its sensitivity will then be relatively low. If the sampling frequency is relatively low, there is a correspondingly greater possibility that a sharp peak in the variable electric signal will be completely missed. The speed of response of the device can then be regarded as low. It is clearly desirable to keep the product of sensitivity and speed of response constant over the whole expected range of the incoming signal. If the variable signal is recurrent and has a frequency equal to the sampling frequency it will be evident that the device will be inoperative, the device thus having a frequency response or bandwidth related to its sampling time. The bandwidth can be expressed as the reciprocal of the sampling time or as a suitable fraction thereof. Bandwidth and speed of response are thus directly related and either term is used as is convenient in the following description. It follows that the bandwidth is reciprocally related to the sensitivity of a slope detecting device of this kind. With an incoming signal in the form of a series of peaks of different shape, the slopes of the leading edges of the peaks can be tested with different sampling frequencies triggered on and off at appropriate time intervals, or with a sampling frequency varying continuously at an appropriate rate, the device thus having different sensitivities and bandwidths appropriate to the expected shape of the peaks.

The invention is particularly but not exclusively useful in connection with the control of apparatus for integrating electric signals in the form of a series of peaks, such as are obtained from a gas chromatograph. The signals from a chromatograph are in the form of a series of pulses, frequently of Gaussian shape, the areas of which are required to be measured. Due to the statistical nature of processes occurring during the formation of these peaks, for the same total peak area, the peak width increases and as a corollary the peak "sharpness" decreases, as time progresses.

The beginning and end of each peak can be detected by a suitable slope detecting system by measuring the rate of change of the signal voltage with time and detecting the instants at which ($dv/dt$) goes from a negative to a positive value. The slope detector output can be applied to a squarer and the squarer output used to form command signals for instructing a device for integrating the incoming pulse when to start and stop integration. The first command signal can be used also as a start signal and to effect printing out of the integrated result of the previous peak.

The sensitivity of the system must be high enough to detect the flattest peaks, for example, the peaks occurring towards the end of the chromatograph "spectrum" and at the same time the speed of response of the system must be great enough to detect the sharpest pulses for example, those occurring at the start of the chromatograph "spectrum." These requirements are in contradiction, and make it difficult to obtain fast enough response for the very sharp early peaks, of which the leading edge rises very rapidly and high enough sensitivity for the flatter later peaks of which the leading edge rises more slowly. Satisfying both requirements at the same time will increase the probability that the slope detecting device will be operated by noise pulses.

In accordance with the invention, the slope detecting device is operated so as to have relatively high response speed and bandwidth and therefore relatively low sensitivity at the beginning of the series where fairly sharp and narrow pulses can be expected. The response speed is reduced as the series proceeds, the bandwidth changing correspondingly, so that the sensitivity of the device is increased to deal with the later flatter peaks of the series. Thus the sensitivity and the speed of response to the system is varied in a predetermined way as each leading edge is tested so as to provide desired sensitivity and response characteristics over the entire chromatograph "spectrum."

By way of example only, apparatus embodying the invention is described below with reference to the accompanying drawing in which the single figure is a block circuit diagram of the apparatus.

The apparatus illustrated is designed for use with a chromatograph providing an output in the form of a series of voltage peaks and comprises a circuit 10 arranged to control a slope detecting device 12.

The device 12 is arranged for detecting peak or trough points of the chromatograph output signal and is in accordance with the disclosure of British Pat. No. 1,060,597 The device consists in brief of a resistor 14 in parallel with a capacitor 16 between input terminals 18, 20 for the signal. The capacitor 16 is in series with a switch 22, the primary winding 24 of a transformer 26 and a second capacitor 28. The ends of the secondary winding 30 of the transformer 24 are connected to a bistable or trigger circuit 34 having output terminals 36, 38.

The voltage across the capacitor 16 follows the voltage developed across the resistor 14 by the signal. The switch 22 is periodically momentarily closed, so that the capacitor 28 assumes the instantaneous voltage on the capacitor 16. If this voltage is different from what it was on the previous closure of the switch, current will flow through the primary winding 24 in one or other direction depending on whether the input voltage has risen or dropped. Dependent on the polarity of the consequent output pulse in the secondary winding 30, the trigger circuit 34 is maintained in its existing condition in which it provides an output on the output terminal 36 or changed to its other condition in which an output appears on the terminal 38.

Returning to the apparatus 10, this comprises a clock 40 arranged to provide a first output on an output line 42 at the end of a first predetermined interval beginning on receipt at the clock of a start signal from the chromatograph over a line 44. At the end of a second predetermined interval, again beginning with the receipt of the start signal, the clock provides a second input on a second output line 46. The start signal will normally correspond to the commencement of a pulse in the chromatograph output, which is applied to the terminals 18, 20. For purposes of illustration the first and second time intervals will be taken as 20 and 100 seconds long respectively; both intervals can conveniently be made adjustable.

The output lines 42, 46 are connected to a tristable sequence device 50. The device has a first condition, in the absence of an output on either of the lines 42, 46 in which it provides a steady output on a first output line 52 and no output on either of second and third output lines 54, 56. On arrival of the clock output pulse on the line 42, 20 seconds after the start signal, the device 50 is changed to a second stable state in which a steady output is provided on the line 54 only.

After a further interval of 80 seconds, the arrival of a clock pulse on the line 46 brings the device 50 to its third steady state, in which the line 52 again has not output, the output on the line 54 disappears and an output is available on the line 56 for the first time.

The apparatus 10 also includes a source 60 of three constant frequency signals on lines 62, 64 and 66 leading respectively to inputs of AND gates 72, 74 and 76. For the present embodiment of signals will be regarded as a 10 c./s. signal on the line 62, a 2 c./s. signal on the line 64 and a ½ c./s. signal on the line 66. The AND gates received at their other inputs the lines 52, 54 and 56 respectively. The outputs of the three AND gates are taken to an OR gate 78 the output of which is applied by a line 80 to control the condition of the switch 22 of the slope detecting device 12.

At the beginning of the chromatograph pulse, the apparatus comes into operation and the sequential tristable device 50 falls into its first condition providing an output on the line 52 to open the AND gate 72, so allowing the 10 c./s. signal to pass through this gate 78 thus transmits the 10 c./s. signal to effect control of the switch 22 at the frequency. After a 20 second interval, the AND gate 72 is closed and the gate 74 opened by the change of the device 50 to its second condition. The 2 c./s. signal on the line is then supplied to the switch 22 through the OR gate 78 to effect opening and closing of the switch at this lower frequency. After a further 80 seconds, the device 60 is changed to its third condition by the arrival of a pulse on the line 46 and the switch 22 is thereafter opened and closed at the frequency of ½ c./s. by means of the signal on the line 66. As mentioned previously, the switch 22, which can be a transistorized switch, is required to be closed only momentarily and the signals for controlling it provided by the source 60 are conveniently shaped so as to effect this.

The illustrated apparatus, of which the various components are all well known in themselves and are therefore not further described, thus provides for variation of the sampling rate of the device 12 and thus of its sensitivity in a predetermined way suited to the expected form of the variable signal under test. When the device 12 has indicated that the end of the chromatograph pulse series has been reached the apparatus 10 is reset so that the next pulse series can be sampled in the way described by provision of a "starting" pulse on the line 44 at the appropriate time.

The slope testing device 12 described can be simplified if high sensitivity is not required by omission of the resistor 14 and the capacitor 16. The invention is not restricted to use in connection with gas chromatographs. It is not confined to the control of any particular kind of slope detecting device but will be understood to be applicable to such devices of any suitable kind. It will be understood also that the changes in the rate of sampling according to the invention are not restricted to those described either in number or direction. The changes may be continuous, at any desired and preferably adjustable rate, or in one or more steps, with any desired interval or intervals between the steps. The scope of the invention is thus as appears from the following claims.

I claim:

1. A method of detecting the slope of a variable signal consisting of a series of pulses of varying form which includes providing a preselected sampling program which includes a plurality of sequential sampling sequences of different frequencies, arranging said sampling sequences in accordance with an expected form of said variable signal to provide a frequency range appropriate to the expected change of slope of the variable signal, sampling said variable signal at rates determined by said preselected sampling program to vary the sampling speed of response during sampling in accordance therewith and detecting the peak or trough points of said variable signal as a result of said sampling.

2. The method of claim 1 which includes arranging said sampling sequences to decrease the sampling speed of response in one or more successive steps.

3. The method of claim 2 in which the sampling time during which each sampling sequence is employed to control sampling of the variable signal increases as the sampling speed decreases.

4. The method of claim 1 in which said sampling sequences are arranged to provide a uniformly decreasing sampling frequency to continuously decrease the sampling speed of response.

5. A device for detecting the slope of a variable signal consisting of a series of pulses of varying form comprising slope detecting means for receiving said variable signal and periodically sampling said variable signal to detect the peaks or troughs thereof, said detecting means operating to provide an output signal indicative of the occurrence of a peak or trough in said variable input signal, and control means connected to said detecting means and operative to vary the sampling speed of response of said detecting means during the sampling of said variable signal in accordance with an expected form of said variable signal, said control means including means for providing a plurality of constant frequency signals, each constant frequency signal being of a frequency which is different from that of the remaining constant frequency signals, sequencing means to receive said constant frequency signals, said sequencing means operating to sequentially provide individual ones of said constant frequency signals to said detecting means to control the sampling speed of response thereof, and timing means connected to said sequencing means and operative to control the time sequence during which constant frequency signals of any frequency are provided to said detecting means.

6. The device of claim 5 wherein said sequencing means operates to provide constant frequency signals in successive steps, said constant frequency signals decreasing in frequency with each successive step to decrease the sampling speed of response of said detecting means and said timing means operates to increase the sampling time of each successive step over that of the next preceding step.

7. The device of claim 6 wherein said sequencing means includes a plurality of AND gates, each AND gate being connected to receive one of said constant frequency signals and a trigger circuit means having a plurality of outputs each connected to a respective one of said AND gates, said timing mans operating to apply clock pulses to said trigger circuit means at predetermined intervals to cause said trigger circuit means to enable each of said AND gates in turn to transmit a different constant frequency signal.